United States Patent
Gracia Lecina

(10) Patent No.: US 7,641,059 B2
(45) Date of Patent: Jan. 5, 2010

(54) MODULAR DEVICE FOR THE SUPPORT OF CASKS

(75) Inventor: Luis Gracia Lecina, Cerdanyola del Vallés (ES)

(73) Assignee: Luis Gracia Sistemas, S.L., Cerdanyoda del Valles (Barcelona) (ES)

( * ) Notice: Subject to any disclaimer, the term of this patent is extended or adjusted under 35 U.S.C. 154(b) by 346 days.

(21) Appl. No.: 11/244,623

(22) Filed: Oct. 6, 2005

(65) Prior Publication Data

US 2006/0081549 A1  Apr. 20, 2006

(30) Foreign Application Priority Data

Oct. 15, 2004  (ES) ................................ 200402445

(51) Int. Cl.
A47G 29/00 (2006.01)
(52) U.S. Cl. .................................... 211/85.22; 211/194
(58) Field of Classification Search .............. 211/85.22, 211/85.18, 85.21, 13.1, 189, 195, 191, 71.01, 211/194, 59.4; 206/446, 504, 509, 511, 512, 206/443, 821; 108/57.13, 57.22–57.24; 220/4.04, 220/4.07–4.09, 4.29, 628, 630; 410/47–50; 99/277.1, 448
See application file for complete search history.

(56) References Cited

U.S. PATENT DOCUMENTS

| | | | | |
|---|---|---|---|---|
| 3,476,260 A | * | 11/1969 | Jay | 206/503 |
| 3,590,752 A | * | 7/1971 | De Pew | 108/55.3 |
| 4,382,733 A | * | 5/1983 | Rodgers | 410/49 |
| 4,391,377 A | * | 7/1983 | Ziaylek, Jr. | 211/85.18 |
| 4,431,107 A | * | 2/1984 | Bergstrom et al. | 211/59.4 |
| 4,567,989 A | * | 2/1986 | Hurst, Jr. | 211/74 |
| 4,747,495 A | * | 5/1988 | Hoss | 211/85.8 |
| 5,242,255 A | * | 9/1993 | Gleffe et al. | 414/403 |
| 5,755,541 A | * | 5/1998 | Suarez | 410/36 |
| 6,077,005 A | * | 6/2000 | Westlake | 410/49 |
| 6,123,208 A | * | 9/2000 | Haenszel | 211/175 |
| 6,279,763 B1 | * | 8/2001 | Bush | 211/195 |
| 6,536,612 B2 | * | 3/2003 | Flores | 211/85.22 |
| 2005/0103731 A1 | * | 5/2005 | Flores | 211/85.22 |

FOREIGN PATENT DOCUMENTS

| | | |
|---|---|---|
| ES | 2 149 749 | 9/2000 |
| ES | 2 169 713 | 1/2001 |
| ES | 1 053 480 | 4/2003 |

* cited by examiner

Primary Examiner—Jennifer E. Novosad
(74) Attorney, Agent, or Firm—Richard M. Goldberg

(57) ABSTRACT

A modular device for the support of casks includes a base structure on which the casks are supported in multiple rows and/or columns formed by at least two, substantially parallel bars, with specular form and geometry, with one end of each of the bars being fitted with a male joining element and the opposite end fitted with a complementary female joining element. Each bar includes at least one pair of upper facing support elements in the form of wedges with facing inclined surfaces, arranged with a mutual separation on the upper side of each of the bars so that they support a cask in a stable position, and at least one other pair of respective lower facing support elements, which are separated, but arranged on the lower side of the bar and in positions that are supported on a lower cask in use.

7 Claims, 3 Drawing Sheets

MODULAR DEVICE FOR THE SUPPORT OF CASKS

TECHNICAL SECTOR OF THE INVENTION

This invention refers to the technical sector of devices for the support of casks, of the type that consist of a base structure on which the casks are supported in multiple rows and/or columns. More specifically, the invention refers to a modular device for the support of casks arranged in rows and columns, with a triangular or square configuration.

BACKGROUND TO THE INVENTION

Within the grape and wine production sector for cavas and other similar products, the use is known of casks, barrels and other containers for storage purposes in wine cellars and stores until such products are distributed. These support structures must be able to withstand considerable weights (multiple casks arranged in several rows and columns) so that they must consist of frameworks with high mechanical strength, which usually results in very large structures that are difficult to install and complicated to transport.

The author of this invention is not aware of a support for casks or similar containers that provides a common solution to the described disadvantages and, at the same time, meets the requirements of high strength, together with ease of handling of the stored containers.

For example, document ES2149749 refers to "Improvements to supports for casks, specifically in supports consisting of a base structure, preferably metal, with a rectangular shape, in which seatings are defined for a pair of casks that are laterally adjacent, from which the vertices emerge uprights that act as spacers in the stacking between supports . . . ", subsequently introducing, as one of the new features, four pulley wheels that rotate the casks. This publication does not make any reference to any support structure that substantially mitigates the inconveniences cited in the first paragraph of this section.

Patent ES2169713 introduces "A load-bearing structure for the handling and stacking of casks, essentially characterised in that it consists of load sleds, with capacity for at least three casks, each aligned longitudinally". This structure continues to be quite voluminous and so, both transport and storage remain relatively complicated.

Document ES1053480U can also be cited as another example, "Support for casks, of the type that incorporates a rectangular base platform, incorporating the means to couple a pair of casks and fitted with, in correspondence with its vertices, tubular elements perpendicular to the general plane of the same, for fixed plug-in coupling of spacer uprights that permit stacking between supports, characterised in that the cited base platform consists of a rectangular frame, from the lower part of which emerge many uniformly distributed short feet, which relate the said frame with four lower rims, comprising billets with rounded ends, located in correspondence with each of the frame sides . . . ". This document introduces a square, definitely complex support, with substantially the same inconveniences cited in the previous paragraphs.

Moreover, almost without exception, current supports for casks all suffer from the inconvenience of their large size, which means they have to be assembled onsite from component elements, involving, for example, welding and painting processes which could turn out to be dangerous in a wine cellar. The alternative is to transport them already assembled from the factory to the wine cellar, which, because of size factors, would involve significant logistics problems.

Wooden sleepers are available for casks that allow the construction of a base structure on which the casks are supported in a first row on wooden wedges of lower casks and which prevent lateral movement of the casks. Further wedges are installed on the casks in the first row, between the casks that collaborate in supporting the upper rows of casks in a triangular fashion. However, an excess of wood is another inconvenience that can be harmful to the ageing of wine in cellars, because it is well known that the trichloroacetic acid that it can produce is highly contaminant to wine.

The purpose of this invention is to provide a joint solution to all the previously described inconveniences and problems.

Although this section and, in general, the entire descriptive report, normally refers to casks, it must be pointed out that the support described in this invention is also suitable for the storage or stacking of any type of containers that is able to fit in a stable fashion in the associated support elements, without limiting the product inside the container.

SUMMARY OF THE INVENTION

To this end, the purpose of this invention is a modular device for the support of casks that consists of two substantially parallel bars, with specular shape and geometry, with each end of the said bars fitted with a male connection element and, at the other end, a complementary female connection element with respect to the said male connection element, with each bar consisting of at least a pair of upper support elements in the form of wedges with their inclined sides facing, arranged with a mutual separation on the upper side of the bar so that they are able to hold a casks in a stable position, and with at least another pair of respective lower separated support elements, but arranged on the lower side of the casks in such positions that they are supported on a lower cask which, in turn, is supported on another corresponding bar.

In accordance with one characteristic of this invention, the stored casks are distributed in a triangular-shaped fashion.

In accordance with another characteristic of this invention invention, the lower facing support elements are in such positions that the stored casks are distributed in a square configuration.

In accordance with another characteristic of this invention, the modular device for supporting casks consists of at least one rigid cross-member, installed in a substantial transverse manner to both parallel bars and anchored for corresponding holes in the said bars.

In accordance with yet another characteristic of this invention, the modular device for supporting casks consists of means of reception designed to receive the arms of a corresponding forklift or other equivalent device, mechanism, apparatus or machine.

These means of reception may consist of rectangular frames, arranged between inferior bar support elements or wedges and with a span of one width greater than the width of the supports of a conventional forklift.

A further characteristic of this invention consists of the modular device for supporting casks with two separation uprights between each cask, with each separation upright comprising a structure of two substantially parallel stanchions, separated by the same distance that separates the parallel bars and an additional cross-member perpendicular to the said parallel stanchions and fixed to them buy the upper ends of the stanchions and fixed to them by the upper ends of the stanchions, with the lower ends of the stanchions designed to be stably supported on the part of the two parallel bars located between the bars with the upper ends of the uprights designed to be coupled in a firm stable fashion to complementary reception elements on the lower side of each bar.

One additional characteristic of this invention is that the upper ends of the stanchions consist of conical terminations that fit into corresponding complementary rabbets on the lower sides of the parallel bars.

In accordance with another additional characteristic of this invention, each of the bars consists of an iron core covered with a plastic material.

In accordance with yet another additional characteristic of this invention, each of the bars is made up of a single piece.

Another characteristic of this invention is that each of the bars is made using a single mould.

Experts in the technique will appreciate that new and inventive characteristics of this invention allow the provision of a support for casks, with a high level of modularity and provide an efficient joint solution to the previously described inconveniences.

Moreover, this invention permits a modular device to be manufactured for the support of casks in a relatively simple, economic fashion, with the corresponding advantages from a production point of view.

Finally, it is important to point out that the modular characteristics of this invention make it possible to manufacture completely plastic modular shelving for the cask support with the consequent sanitary and environmental advantages.

A BRIEF DESCRIPTION OF THE DRAWINGS

In a non-limiting manner, the attached drawings illustrate embodiment examples of the modular device for the support of casks covered by this invention. In these drawings.

DETAILED DESCRIPTION OF THE DRAWINGS

The said drawings show several embodiment examples of this invention.

Figure 1:
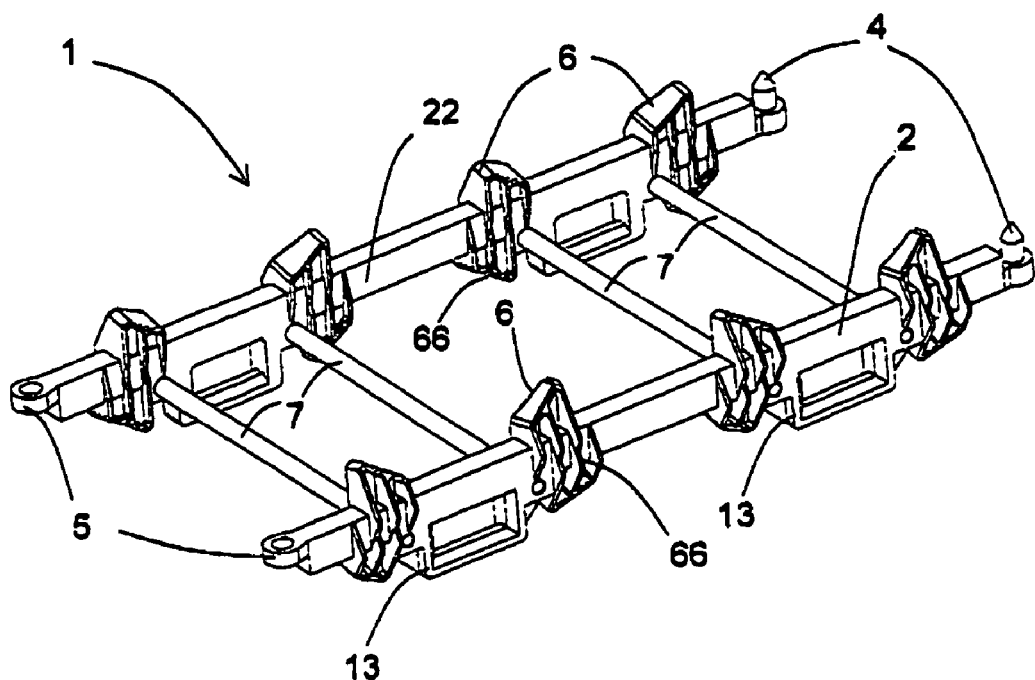
FIG. 1 is a perspective view of an embodiment example of the modular device of this invention.

First, modular device 1 for the support of casks 3 is described, with reference to FIG. 1, in which two parallel bars 2, 22 can be seen, which are joined by rigid cross-members 7. In this embodiment example shown in the said FIG. 1, a modular device 1 has been employed to support the casks 3, or better, a modular device module 1, which is able to support two casks 3, although this aspect, as mentioned in claim 1, is not limiting, and the number of casks 3 that can be accepted by each pair of bars 2, 22 is optional and depends on the manufacturer's requirements and the characteristic limitations of the physical and mechanical properties of the materials employed.

The design and geometry of the bars 2, 22 are such that, when the said bars 2, 22 are positioned in parallel, ready to receive the casks 3, they provide a specular symmetry, in other words, one of the bars 2, 22 is the mirror image of the other.

The number of casks 3 that can be accepted is indicated by the number of pairs of wedge-shaped support elements 6, 66. As can be seen from FIG. 1, each bar 2, 22 has two ("2") pairs of wedges 6 in its upper section, which indicates that this module, made up of the two bars 2, 22 can support two ("2") casks 3. The separation and the shape of the wedge 6 may be varied depending on the cask 3 size and/or weight, although universal dimensions and separations may be established that can be used with most casks and barrels currently existing on the market.

Figure 2:
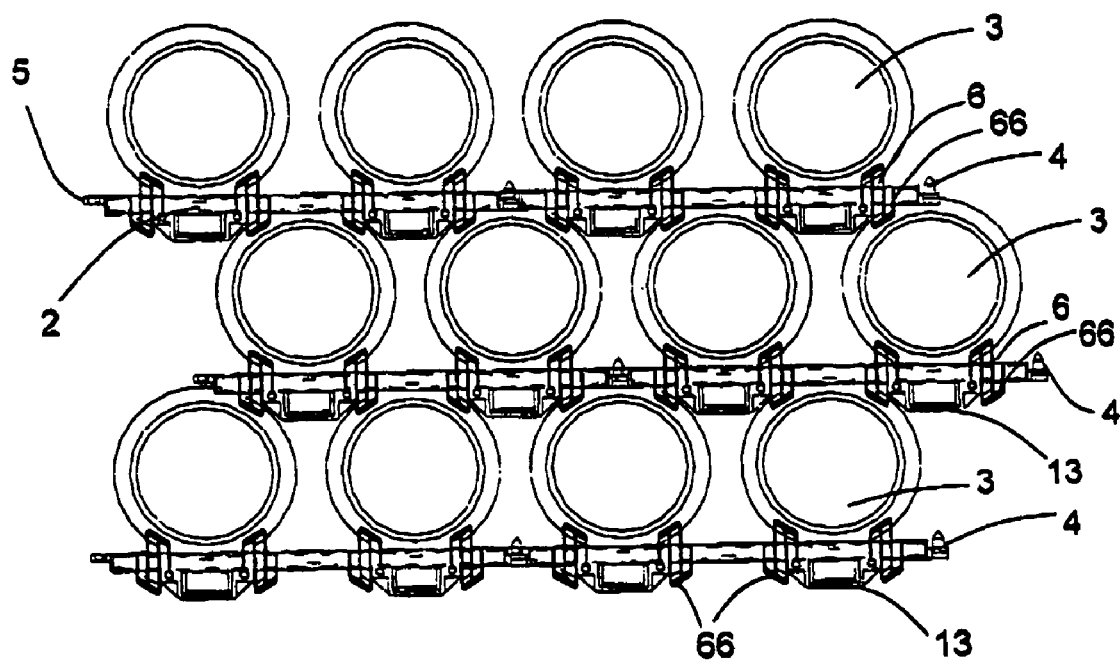
FIG. 2 is a perspective front elevation view of an embodiment example of the modular device for casks support comprising several modules and with the casks in their storage positions.

As can be seen from the drawing, the casks 3 are located between each pair of wedges 6. The facing positions of the inclined surfaces of the wedges 6 provide a stable seating for the substantially cylindrical side surfaces of the casks 3. FIG. 2 shows the position of each cask 3 on the support elements 6 with greater clarity.

The rigid cross-members 7 are, as their name indicates, elements that are intended to provide enhanced strength to the modular device 1 assembly. In the case of FIG. 1, four rigid cross-members 7 are shown perpendicular to bars 2, 22, although their number, as in the case of the wedges 6, 66, can vary depending on the required mechanical strength for the modular device 1.

It is important for the said cross-members 7 to be firmly secured to the bars 2, 22, so that they form a mechanically strong assembly that can withstand the forces produced by the weight of the multiple casks 3. In a preferred embodiment example, the cross-members 7 are secured to the bars 2, 22 through the holes in the same.

Other essential elements for the modular device 1 of this invention are the wedges 66 arranged in the lower section of each bar 2, 22. It should be pointed out that the shape and/or geometry of these wedges 66 is the same as that of the previously described corresponding ones in relation to the upper section of the bars 2, 22. These are also pairs of wedges 66 with a separation and inclined surfaces that are suitable for adapting to the substantially cylindrical shape of the side wall of the cask 3. The purpose of these lower wedges 66 is to form a self-standing modular device. In other words, just as can seen better in FIG. 2, the support of the lower wedges 66 on the casks 3 which, in turn, are supported on bar 2, 22 of the lower row, means that the modular device 1 is able to firmly support the entire framework, without any need for auxiliary structural elements. The actual casks 3 themselves make up these auxiliary elements.

In warehouses and cellars in which these casks 3 are stored, it is usual to have to transport them for distribution reasons or other movement operations. For this reason, the means of reception 13 have been provided that are useful to guide the possible arms of a forklift vehicle. In this way, the casks 3 can be moved as if loaded on a pallet, although with the structural advantages of the modular device 1 as described in the preceding paragraphs. This means of reception are preferable made up of rectangular frames 13, installed between support elements or lower wedges 66 of the gars 2, 22, and with a width span that is greater than that of the support of a conventional forklift vehicle.

Figure 5:
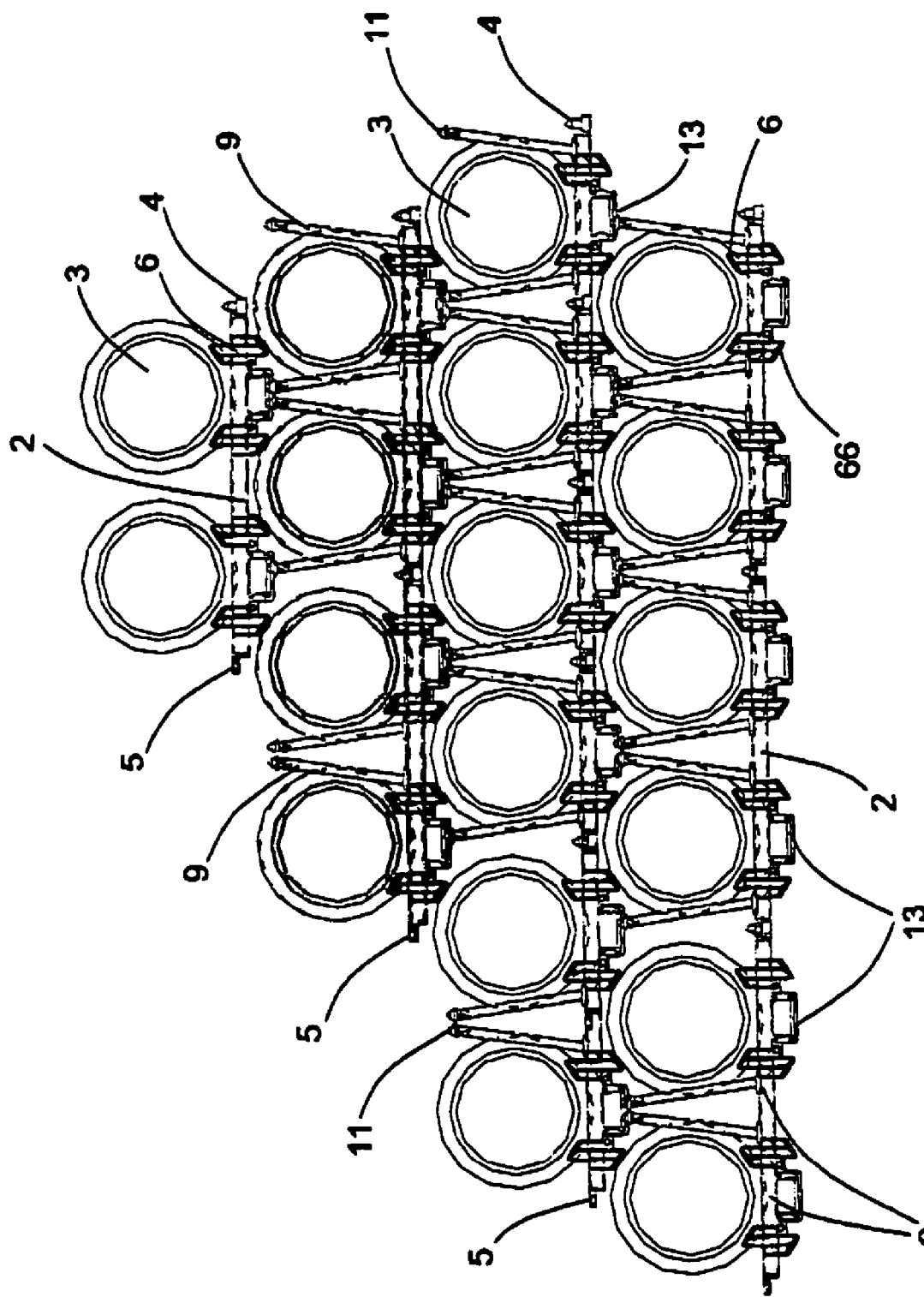
FIG. 5 is a front elevation view of another embodiment example of the modular device for casks support comprising several modules, with the separation uprights installed and the casks in their storage positions.

FIG. 2 shows a set of modular devices 1 assembled by means of joining elements 4 and 5, forming support shelving for wine casks. Specifically, six modular devices 1 are shown that are able to hold a total of twelve casks 3. The joining elements 4 and 5 are specifically a male joining element 4 and a female joining element 5, which are designed to firmly couple together in a manner that establishes longitudinal coupling of the various parallel bars 2, 22 as shown in FIGS. 2 and 5.

The longitudinal coupling system of the bars 2, 22 can be of any type provided it provides sufficient rigidity and strength to the overall device 1 assembly. The system shown in this embodiment example is simple and, at the same time, efficient.

It has just been mentioned that the longitudinal rigidity of the modular device 1 is provided by the joining elements 4 and 5, whereas the vertical rigidity comes from the actual casks 3 themselves, on which the bars 2, 22 of the immediately-above row are supported. This self-standing version of the modular device 1, although implementation and installation are both simple and efficient, might not be sufficient in those cases that require rotation to permit an operation known as "battonage" of the casks 3 since the weight of the upper rows of bars 2, 22 would prevent said rotational movement of the casks 3 that supports all the weight. For this reason, uprights 8 are provided that are essentially formed by a rectangular structure consisting of two parallel stanchions 9 and a cross-member 10 perpendicular to them.

Figure 3:
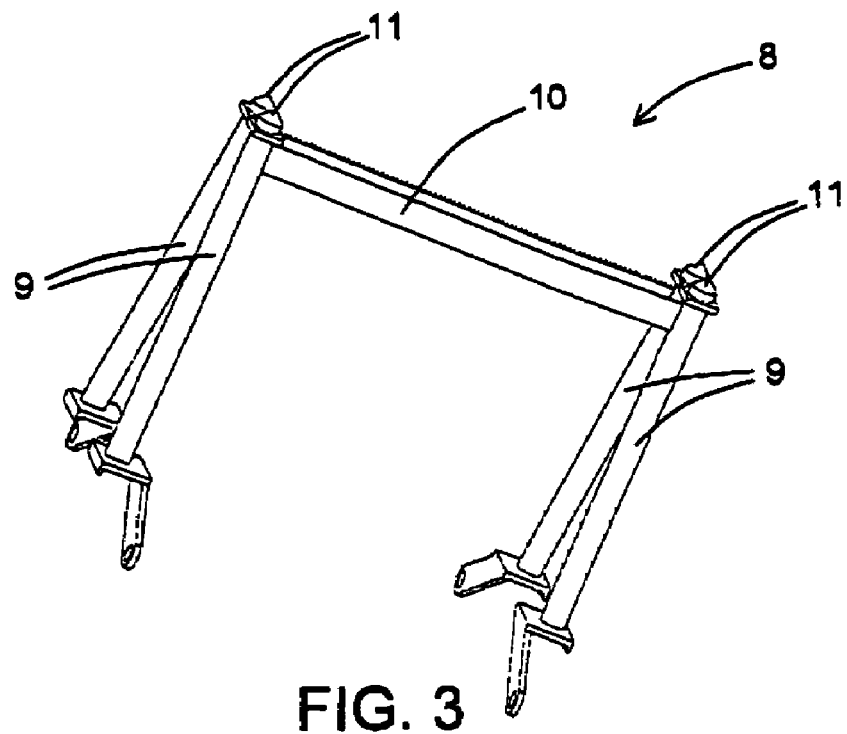
FIG. 3 is a perspective view of the separation upright corresponding to an embodiment example of the cask support in this invention.
Figure 4:
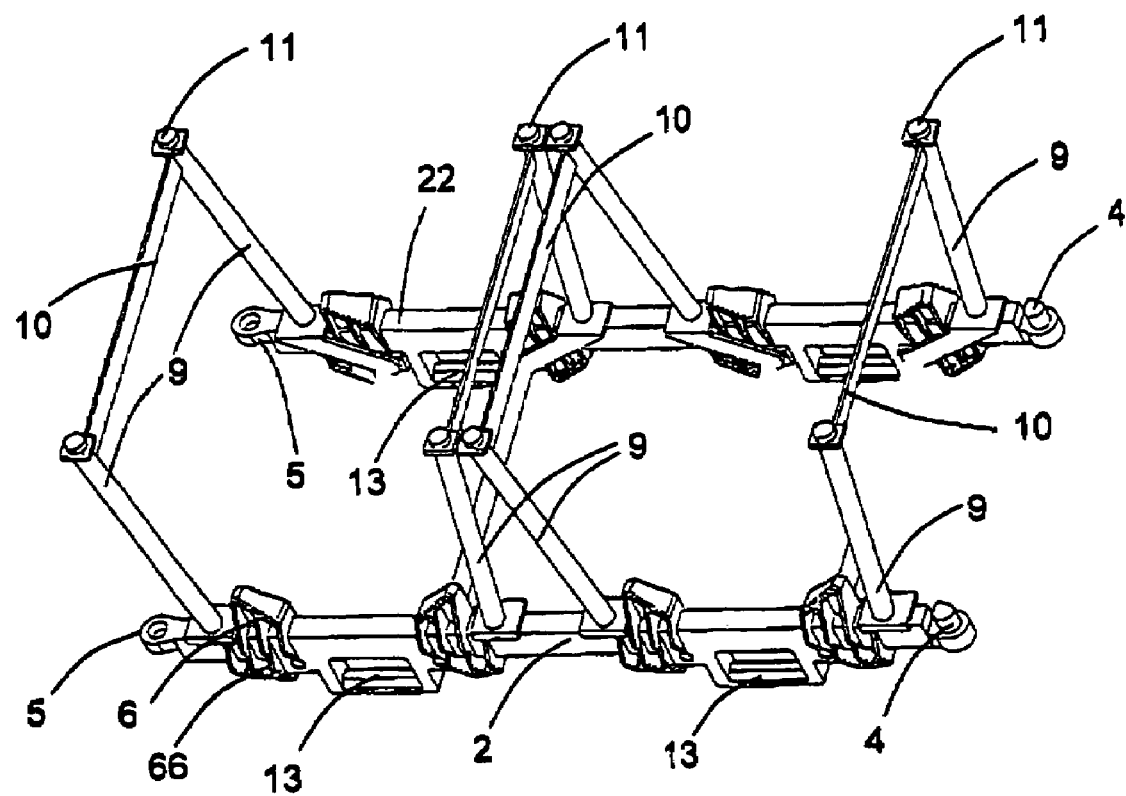
FIG. 4 is a perspective view of the modular device for the support of casks with the separation uprights installed.

FIG. 3 shows a perspective view of two of these uprights 8 arranged in pairs between the casks 3. In a preferred embodiment example of the uprights 8, the upper ends of the stanchions 9 are fitted with conical terminations 11 that are suitable for fitting into rabbets on the lower sections of the bars 2, 22 and in this manner, a firm coupling of the stanchions 9 in the modular device 1 is achieved. This coupling may be implemented according to the desired form without deviating with respect to the scope of the invention since that essential aim is that the uprights 8 accomplish their support function for the bars 2, 22 of the upper rows.

In addition, the lower ends of the stanchions 9 have flat bases designed to fit against the upper surface of the bar 2, 22 on which they are supported; these flat bases can include angled profiles or stops or guides for firmer fitting to the upper surface of the corresponding bar 2, 22 (see FIG. 3).

It should be stressed that, although FIGS. 2 and 5 show a triangular casks 3 configuration, in other words, with the casks 3 of each bar 2, 22 alternating in the positions of the cavities of the contiguous upper and lower rows, the said configuration may be varied in order to obtain, for example, a square formation or "vertical" support, in other words, with the casks forming rows and columns in the shape of a square, simply be varying the relative positions of the wedges 66 located in the lower section of the bars 2, 22 with respect to the wedges 6 located in the upper section of the bars 2, 22.

Another advantageous aspect of the modular device 1 of this invention is that the bars 2, 22 can be produced from a single mould in a single piece, thus simplifying the production process.

In a preferred embodiment example of this invention, the bars 2, 22, including the support elements or wedges 6, 66, conical terminations 11 and frames 13, consist of a metal core, preferably iron covered by a plastic material. In this way, they will produce a modular device 1 for the support of casks 3 that is easily manufactured, stored and transported.

In a similar fashion, the stanchions 9 and the cross-members 7 and 10, preferably consist of a metal core, preferably iron, covered by a plastic material. In this way, the entire exterior surface of the support structure, formed by the modular elements in accordance with this invention is plastic, at the same time having an internal structure or core made of high-strength metal, with all the advantages resulting from this composition from the strength and sanitary points of view.

Experts in the technique will understand that, with the principles of this invention, it is possible to produce shelving for the support of casks with the indicated elements, with only two plastic injection moulds, one for the bars 2, 22, which are manufactured with small mould variations and another for the uprights 8. The rigidising cross-members 7 could even be a commercial product.

Finally, it is necessary to point out that the distance between two consecutive levels in cask 3 height can be increased by means of shims fitted to the wedges 66.

With the nature of this invention sufficiently described, together with the manner of putting it into practice, it is stated that anything that does not alter, change or modify its fundamental principle, could be subject to variations in details.

The invention claimed is:

1. A modular device for the support of casks including a base structure on which the casks are supported in multiple rows and/or columns, comprising:

at least two, substantially parallel bars, with specular form and geometry, with one end of each of said bars being fitted with a male joining element and an opposite end of each of said bars fitted with a complementary female joining element with respect to said male joining element, the joining elements being constructed such that the male joining element of one bar and the female joining element of another bar are adapted to be coupled together in a direction substantially perpendicular to a lengthwise direction of the bars, at least one pair of upper facing support elements which are mounted on the parallel bars in a manner such that the separation between adjacent upper facing support elements is adapted to be varied, the at least one pair of respective upper facing support elements having wedges with facing inclined, surfaces, mounted on a top of each of the bars so that the upper facing support elements are adapted to support a cask in a stable position, and at least one other pair of respective lower facing support elements which are mounted on the parallel bars in a manner such that the separation between adjacent lower facing support elements is adapted to be varied, the at least one other pair of respective lower facing support elements having wedges with facing inclined, surfaces, mounted on a bottom of the bars and in positions so that the lower facing support elements are adapted to be supported on another cask in use.

2. A modular device for the support of casks in accordance with claim 1, further comprising at least one rigid cross-member, arranged in a substantially transverse manner to the two parallel bars and anchored in corresponding holes in said bars in a detachable manner.

3. A modular device for the support of casks in accordance with claim 1, further comprising a reception arrangement mounted on all of the bars for receiving arms of a forklift vehicle.

4. A modular device for the support of casks in accordance with claim 3, wherein the reception arrangement includes rectangular frames, installed between the lower facing support elements on the bars.

5. A modular device for the support of casks in accordance with claim 1, wherein the male joining element is a vertical pin, and the female joining element is a through hole.

6. A modular device for the support of casks including a base structure on which the casks are supported in multiple rows and/or columns, comprising:

at least two, substantially parallel bars, with specular form and geometry, with one end of each of said bars being fitted with a male joining element and an opposite end of each of said bars fitted with a complementary female joining element with respect to said male joining element, the joining elements being constructed such that the male joining element of one bar and the female joining element of another bar are adapted to be coupled together in a direction substantially perpendicular to a lengthwise direction of the bars, at least one pair of upper facing support elements which are mounted on the parallel bars in a manner such that the separation between adjacent upper facing support elements is adapted to be varied, the at least one pair of respective upper facing support elements having wedges with facing inclined, surfaces, mounted on a top of each of the bars so that the upper facing support elements are adapted to support a cask in a stable position, at least one other pair of respective lower facing support elements which are mounted on the parallel bars in a manner such that the separation between adjacent lower facing support elements is adapted to be varied, the at least one other pair of respective lower facing support elements having wedges with facing inclined, surfaces, mounted on a bottom of the bars and in positions so that the lower facing support elements are adapted to be supported on another cask in use, separation uprights including two stanchions, and an additional cross-member perpendicular to said stanchions and fixed to upper ends of the stanchions, with lower ends of the stanchions constructed to be stably supported on parts of the two parallel bars and located between the bars, the separation uprights being mounted at positions between opposite ends of each bar.

7. A modular device for the support of casks in accordance with claim 6, wherein upper ends of the uprights include conical terminations that fit into corresponding complementary rabbets on lower sides of the parallel bars.

* * * * *